(12) United States Patent
Rogers et al.

(10) Patent No.: US 6,225,621 B1
(45) Date of Patent: May 1, 2001

(54) LASER PHOTOELECTRIC SENSOR

(75) Inventors: John D. Rogers, Coatesville, PA (US); Steven H. Mersch, Germantown, OH (US)

(73) Assignee: Automatic Timing & Controls, Inc., Lancaster, PA (US)

( * ) Notice: Subject to any disclaimer, the term of this patent is extended or adjusted under 35 U.S.C. 154(b) by 0 days.

(21) Appl. No.: 09/307,110

(22) Filed: May 7, 1999

(51) Int. Cl.[7] ........................................ G01C 1/00
(52) U.S. Cl. ............................... 250/221; 304/555
(58) Field of Search ........................ 250/221, 221.1; 340/555–557

(56) References Cited

U.S. PATENT DOCUMENTS

| | | | |
|---|---|---|---|
| 3,614,449 | 10/1971 | Ward, III | 250/203 |
| 3,941,483 | 3/1976 | Ferrin | 356/152 |
| 4,290,043 | 9/1981 | Kaplan | 340/29 |
| 4,807,166 | * 2/1989 | Zalenski | 250/221 |

FOREIGN PATENT DOCUMENTS

| | | |
|---|---|---|
| 0601847 | 6/1994 | (EP) . |
| 0709798 | 5/1996 | (EP) . |

\* cited by examiner

*Primary Examiner*—Stephone B. Allen
(74) *Attorney, Agent, or Firm*—Faye, Sharpe, Fagan, Minnich & McKee, LLP

(57) ABSTRACT

A laser diode (22) emits laser light which is collimated into parallel rays with collimating lens (24). The collimated beams travels as much as 50 meters or more before being reflected back to a photoreceiver (28). A ball lens (26) focuses the reflected light onto the photoreceiver. The photoreceiver, preferably, is a synchronous detector which issues control pulses to a laser drive circuit (42) for causing the laser diode to emit intermittent bursts of laser light. The synchronous detector then compares the timing of received light with the timing of the control pulses to the laser diode to distinguish between true reflected light and stray light. An intensity adjustment (56) adjusts the intensity of the laser light in accordance with a distance between the laser diode/photoreceiver and a reflector. In this manner, distances of 1–70 meters can be accommodated with no lens modification. A reference voltage (48) proportional to the intensity of the laser light is used in a gated feedback (46) for faster response times.

18 Claims, 2 Drawing Sheets

LASER PHOTOELECTRIC SENSOR

BACKGROUND OF THE INVENTION

The present invention relates to the laser sensor art.

Heretofore, laser sensors have included a laser diode or other laser source which was focused to a preselected focal length by a convergent focusing lens. Laser light reflected from a reflector was received by another convergent lens with a relatively long focal length and focused on a photodiode detector. The output of the photodiode was monitored and an electronic signal was generated indicative of the reception of the reflected laser beam or the absence of the reflected laser beam. In order to distinguish between the reflected laser beam and stray light of like color, some laser sensors included a feedback system, such as a continuous wave type feedback system, between the laser source and the detector.

Although successful, such prior laser sensors have drawbacks. First, the prior laser sensors are typically operative for a relatively short distance range, on the order of up to 30 meters. Even within that distance range, different lenses on the laser are required for different distances. Typically, the selected laser sensor must be matched to the application. Although less critical on the receiving side, the receiving lenses again must be compatible with the distance for which the sensor is calibrated. The longer focal length lenses at the receiving side tend to use only part of the photodetector as the length becomes longer, reducing sensitivity. If the length is too long, the lens may focus off the photodetector.

The present invention provides a new and improved laser sensor which overcomes the above-referenced problems and others.

SUMMARY OF THE INVENTION

In accordance with one aspect of the present invention, a laser is provided. A laser diode is powered by a laser drive circuit to emit laser light. A collimating lens mounted adjacent the laser diode collimates the emitted laser light. A photoreceiver receives reflected laser light and produces an output signal indicative of the receipt/non-receipt of reflected laser light. An optical lens is disposed adjacent the photoreceiver for focusing the reflected laser light onto the photoreceiver. The optical lens has an f-number less than 1.0.

In accordance with another aspect of the present invention, a method of laser sensing is provided. Laser light is emitted and collimated into a collimated beam of parallel rays. The collimated beam is transmitted across a region of interest and is reflected back across the region of interest. The reflected laser beam is focused with a lens having an f-number less than 1.0. The focused, reflected laser light is detected. A presence/absence of reflected laser light is determined.

In accordance with a more limited aspect of the present invention, the optical lens is a ball lens.

One advantage of the present invention is that it senses over ranges of up to 50–70 meters.

Another advantage of the present invention is that no lens replacements are required to change between long and short distance ranges. The same sensor can be used for either long or short distances without lens changes.

Still further advantages of the present invention will become apparent to those of ordinary skill in the art upon reading and understanding the following detailed description of the preferred embodiments.

BRIEF DESCRIPTION OF THE DRAWINGS

The invention may take form in various components and arrangements of components, and in various steps and arrangements of steps. The drawings are only for purposes of illustrating a preferred embodiment and are not to be construed as limiting the invention.

DETAILED DESCRIPTION OF THE PREFERRED EMBODIMENTS

Figure 1:
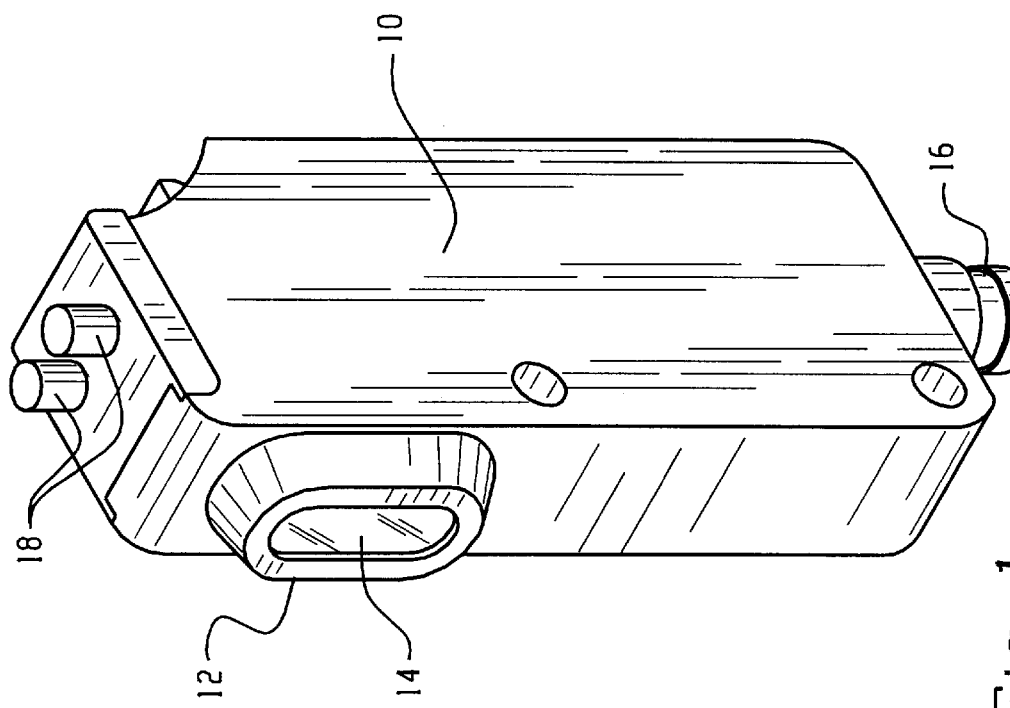
FIG. 1 is a perspective view of a laser sensor in accordance with the present invention.

With reference to FIG. 1, the laser sensor includes a housing 10 including a forward projecting portion 12. The forward projecting portion includes a window 14 through which a laser beam is projected and through which reflected laser light is received. An electrical fitting or connector 16 includes contacts for electrical power in and signals indicative of whether or not the laser beam is interrupted going out. Red and green LEDs 18 provide a local, visual indication regarding whether the beam is interrupted and whether the laser sensor is powered.

Figure 2:
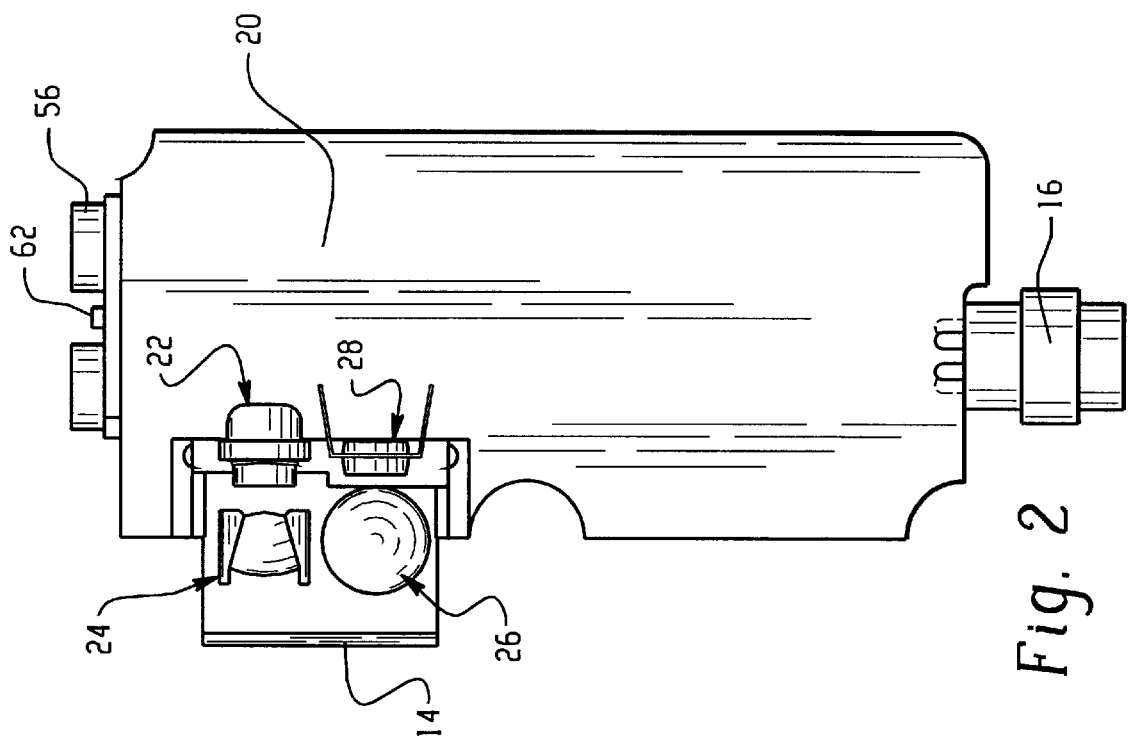
FIG. 2 is a side view illustrating optical and opto-electrical components of the laser sensor of FIG. 1 supported on a circuit board; and, FIG. 3 is a circuit diagram of the circuit carried on the circuit board.

With reference to FIG. 2, a circuit board 20 is connected with the electrical connector 16 and supported centrally in the housing 10. The circuit board also supports a laser diode 22, visible red in the preferred embodiment. A collimating lens 24 is mechanically mounted adjacent the laser diode 22. The collimating lens collimates the light, rather than focusing it on a focal point at a selected distance. The collimating lens causes a laser beam of parallel rays to be emitted without converging. The collimated parallel rays are more forgiving of object size and target distance relative to focused beams.

The reflected laser light returning through the window 14 encounters a ball lens 26 which focuses the light onto an active surface of a photoreceiver 28. The ball lens has a larger field of view which adds flexibility in target size and target distance. The ball lens has a very short focal length, on the order of its radius, 3 mm in the preferred embodiment, for focusing parallel and other rays on the photoactive surface. Ball lens with diameters of 3–12 mm are also contemplated. Moreover, the ball lens has a high efficiency due to its low f-number (focal length÷aperture). The index of refraction of the ball lens is selected relative to the wavelength of the selected light such that the light is focused substantially on the circumference of the sphere which abuts the photosensitive surface, preferably an index of 1.5±0.1 at 650 nm. For visible red light, glass, acrylic, polycarbonate, polystyrene, and other optical materials are preferred. The ball lens can also be tinted to function concurrently as a filter.

Other receiving lenses 26 are also contemplated. Other lenses with an f-number of less than 1.0 can also produce satisfactory results, with an f-number of 0.6–0.7 being optimal.

Optical lasers in the near infrared range, preferably below 1100 nanometers are also contemplated. The use of lasers with significantly higher or lower wavelengths is also contemplated, provided a sensor which is sensitive to that wavelength is selected. Optionally, a phosphor which is energized by one wavelength and which emits light of another wavelength may be used as an interface between mismatched lasers and detectors.

Figure 3:
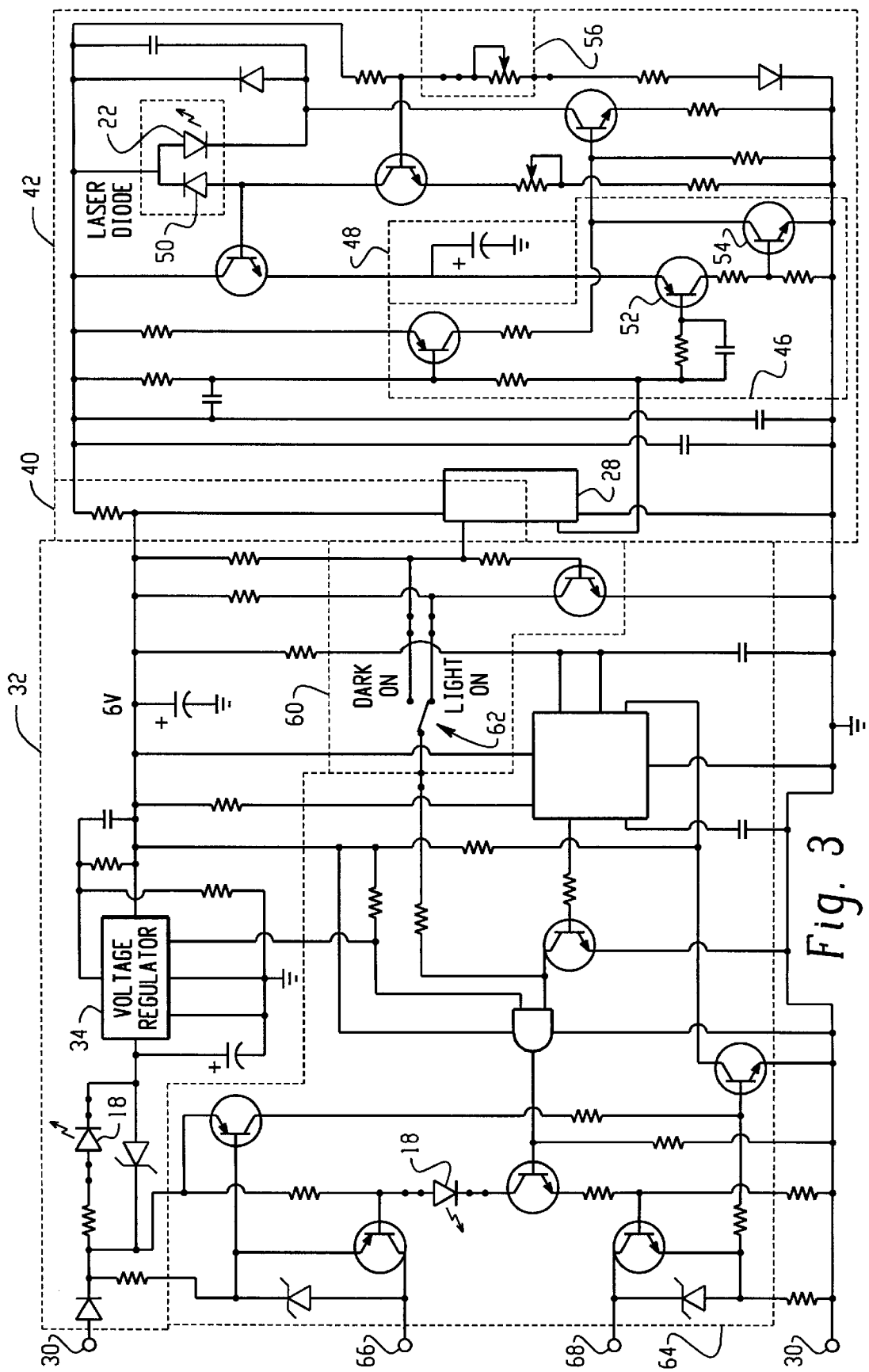

With reference to FIG. 3, a DC voltage contact and a ground contact pair 30 are physically located in the electrical connector 16. The contact 30 preferably receives 10–30 volts DC. A power conditioning circuit 32 including a voltage regulator chip 34 converts the received power into a regulated 6 volts.

The regulated voltage powers a sensing circuit 40 and a laser drive circuit 42. The sensing circuit includes a photosensor. More specifically, the sensing circuit includes a pulse modulation synchronous detector chip, such as a Sharp IS450. The synchronous detector chip includes the light sensitive circuit, accompanying amplification and signal conditioning circuitry, and the like. In the preferred embodiment, the same chip also includes the synchronization circuitry, although such circuitry could be provided separately. That is, the chip 28 further generates pulses for pulsing the laser diode 22 and an internal comparitor for comparing whether received light is received at an appropriate timing relative to the pulsing of the laser diode. Based on the reaction speed of the laser diode, the travel time of the light from the laser diode to the reflective surface and back to the photosensitive surface, and the speed of the circuitry within the detector chip 28, there is a known time interval or window within which reflected laser light is received. The comparitor filters out any light received at other times.

The pulse modulation output of the detector chip 28 is connected to a gated feedback circuit 46 for turning the laser diode ON and OFF. A reference voltage source 48 provides the laser diode assembly with a regulated reference voltage that is proportional to the amount of emitted light to provide an automatic, dynamic intensity adjustment. The reference voltage source is connected to a photodiode 50 mounted behind the laser diode 22 for sensing its output. The gated feedback circuit includes switches 52, 54 for switching the reference voltage from source 48 in and out for sharper pulses, particularly for faster rise times and less phase delay without excessive over-shoot of the laser drive current. The faster rise time and less phase delay allows the circuit to function with the synchronous detection circuitry with little degradation and performance while limiting destructive leading edge current peaks caused by the inherent lag in the response of the feedback monitoring photodiode 54.

An intensity adjustment device 56 is used to adjust the intensity of the laser diode. For measurements over a range of 50–70 meters, the intensity adjustment causes the laser diode 22 to be driven substantially at its highest brightness. However, for measurements made over shorter distances, the intensity of the diode is dimmed. When the diode intensity is too high, the target can mimic the reflector. An object passing through the beam close to the housing 20 can reflect a magnitude of laser light back to the photoreceiver 28 that is within the same magnitude range as light returned from the reflector. The collimated parallel rays accurately target a reflector at distances of 1 meter or less up to 70 meters or more, with no lens modification. The ball lens with its wide field of view can receive light reflected from targets as close as 1 meter or less up to 70 meters or more, with no lens modification. Thus, the intensity adjustment is the adjustment for the distance between the laser and the reflector.

When the detection circuit 28 detects reflected laser light, it outputs a signal to a dark-on/light-on selection circuit 60. That is, depending on the application, it may be advantageous to have an output signal when reflected light is received or it may be advantageous to have an output signal whenever no reflected light is received. The dark-on/light-on circuit includes a switch 62 with which the user can make this selection.

An output circuit 64 shapes the output signal to control a pair of analogous output transistors to produce a PNP output on a PNP output terminal 66 and an NPN output on an NPN output terminal 68. The output terminals 66, 68, which are again located in the electrical connector 16, carry the high and low signals from the transistors to downstream equipment.

The invention has been described with reference to the preferred embodiment. Obviously, modifications and alterations will occur to others upon reading and understanding the preceding detailed description. It is intended that the invention be construed as including all such modifications and alterations insofar as they come within the scope of the appended claims or the equivalents thereof.

Having thus described the preferred embodiment, the invention is now claimed to be:

1. A laser sensor comprising:
   a laser diode;
   a laser drive circuit for providing power to the laser diode to cause it to emit laser light;
   a collimating lens mounted adjacent the laser diode for collimating the laser light into parallel rays;
   a photoreceiver for receiving reflected laser light and producing an output signal indicative of the receipt/non-receipt of reflected laser light;
   a ball lens abutting the photoreceiver for focusing reflected laser light onto the photoreceiver.

2. The laser sensor as set forth in claim 1 further including:
   an intensity adjustment for adjusting the power to the laser diode to adjust an intensity of emitted laser light in accordance with a distance between the laser sensor and a reflector.

3. A laser sensor comprising:
   a laser diode;
   a laser drive circuit for providing power to the laser diode to cause it to emit laser light;
   a collimating lens mounted adjacent the laser diode for collimating the emitted laser light;
   a photoreceiver for receiving reflected laser light and producing an output signal indicative of receipt/non-receipt of reflected laser light;
   an optical lens disposed adjacent the photoreceiver for focusing the reflected laser light onto the photoreceiver, the optical lens having an f-number less than 1.0.

4. The laser sensor as set forth in claim 3 wherein the optical lens has an f-number of 0.6–0.7.

5. The laser sensor as set forth in claim 4 wherein the optical lens is a ball lens.

6. The laser sensor as set forth in claim 3 wherein the photoreceiver includes a synchronous detector, the photoreceiver generating enable signals for intermittently enabling driving the laser diode and comparing whether received light temporally corresponds to periods in which the laser diode was enabled.

7. The laser sensor as set forth in claim 6 further including:
   a reference voltage source which carries a reference voltage which varies in accordance with an amount of light emitted by the laser diode; and
   a gated feedback circuit controlled by the output signal of the photoreceiver for gating the reference voltage to the laser driving circuit.

8. The laser sensor as set forth in claim 7 wherein the gated feedback circuit includes transistors for switching the reference voltage in and out to reduce rise times in laser diode driving pulses of the laser drive circuit.

9. The laser sensor as set forth in claim 7 further including:

an intensity adjustment for adjusting an intensity of the laser diode.

10. The laser sensor as set forth in claim 5 wherein the laser diode emits light in a visible red near infrared spectrum range and the ball lens has an index of refraction of 1.4–1.6 at 650 nm.

11. A method of laser sensing comprising:

emitting laser light;

collimating the laser light into a collimated beam of parallel rays;

transmitting the collimated beam across a region of interest;

reflecting the collimated laser beam back across the region of interest;

focusing the reflected laser light with a lens having a f-number less than 1.0;

detecting the focused reflected laser light;

determining a presence/absence of detected, reflected laser light.

12. The method as set forth in claim 11 wherein the f-number is between 0.6–0.7.

13. The method as set forth in claim 11 wherein the focusing is achieved with a ball lens.

14. The method as set forth in claim 11 wherein the collimated laser beam is transmitted at least 40 meters before being reflected.

15. The method as set forth in claim 11 wherein the collimated laser beam is transmitted over 50 meters before being reflected and is transmitted 50 meters after reflection before being focused and detected.

16. The method as set forth in claim 11 further including:

synchronously controlling intermittent generation of the laser light and detection of the received laser light to distinguish between received laser light and received stray light.

17. The method as set forth in claim 11 further including:

adjusting an intensity of the generated laser light in accordance with a distance over which the laser beam is transmitted and reflected.

18. The method as set forth in claim 11 further including:

creating a reference voltage proportional to an intensity of generated laser light and gating the reference voltage to control generation of laser light.

* * * * *